US012793079B2

(12) United States Patent
Mulani et al.

(10) Patent No.: US 12,793,079 B2
(45) Date of Patent: Nov. 10, 2026

(54) METHOD AND SYSTEM FOR PERFORMING TRANSACTION BY IMPLEMENTING A TOKEN PROVISIONING SERVICE

(71) Applicant: Visa International Service Association, San Francisco, CA (US)

(72) Inventors: Pramod Manohar Mulani, Mumbai (IN); Manjit Ranjan Hota, Mumbai (IN); Rajagopal P., Mumbai (IN); Vaibhav Shukla, Bangalore (IN); Satish Kumar Patruni, Bengaluru (IN); Anandan Ethirkottai Sundararajan, Karnataka (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/839,359

(22) PCT Filed: Feb. 16, 2023

(86) PCT No.: PCT/IB2023/051387

§ 371 (c)(1),
(2) Date: Aug. 16, 2024

(87) PCT Pub. No.: WO2023/156924

PCT Pub. Date: Aug. 24, 2023

(65) Prior Publication Data

US 2025/0156879 A1 May 15, 2025

(30) Foreign Application Priority Data

Feb. 16, 2022 (IN) ............................ 202241008118

(51) Int. Cl.
*G06Q 20/42* (2012.01)
*G06Q 20/34* (2012.01)
*G06Q 20/40* (2012.01)

(52) U.S. Cl.
CPC ......... *G06Q 20/425* (2013.01); *G06Q 20/341* (2013.01); *G06Q 20/401* (2013.01)

(58) Field of Classification Search
CPC ... G06Q 20/425; G06Q 20/341; G06Q 20/401
See application file for complete search history.

(56) References Cited

U.S. PATENT DOCUMENTS 11,080,696 B2 * 8/2021 Flurscheim ........ G06Q 20/4018
2016/0148197 A1 * 5/2016 Dimmick ........... G06Q 20/3821 705/67

(Continued)

FOREIGN PATENT DOCUMENTS

CN 109074582 A 12/2018
JP 6652379 B2 2/2020

*Primary Examiner* — Raven E Yono
(74) *Attorney, Agent, or Firm* — The Webb Law Firm

(57) ABSTRACT

The present disclosure discloses a method and a system for performing transaction including when a user initiates a card transaction at an entity, the method comprises receiving card information of the user from the entity for performing transaction. In response to receiving the card information, the method comprises identifying whether an alternate identifier is present for the card information in a first server. If the alternate identifier is present in the first server, the method comprises transmitting the alternate identifier from the first server and a cryptogram value associated with the alternate identifier to the entity for performing the transaction. If the alternate identifier is not present in the first server, the method comprises transmitting the alternate identifier for the card information by obtaining the alternate identifier from a second server and the cryptogram value associated with the alternate identifier to the entity for performing the transaction.

12 Claims, 7 Drawing Sheets

(56) References Cited

U.S. PATENT DOCUMENTS

| | | | | |
|---|---|---|---|---|
| 2017/0091757 | A1* | 3/2017 | Lloyd | G06Q 20/12 |
| 2018/0069936 | A1 | 3/2018 | Kumnick | |
| 2018/0108014 | A1 | 4/2018 | Williams | |
| 2018/0295104 | A1 | 10/2018 | Narayan et al. | |
| 2021/0256518 | A1 | 8/2021 | Shastry et al. | |

* cited by examiner

METHOD AND SYSTEM FOR PERFORMING TRANSACTION BY IMPLEMENTING A TOKEN PROVISIONING SERVICE

CROSS-REFERENCE TO RELATED APPLICATIONS

This application is the United States national phase of International Patent Application No. PCT/IB2023/051387 filed Feb. 16, 2023, and claims the benefit of Indian Patent Application number 202241008118 filed Feb. 16, 2022, the disclosures of which are hereby incorporated by reference in their entireties.

BACKGROUND

1. Technical Field

The present disclosure relates to performing a transaction. Particularly, but not exclusively, the present disclosure relates to a system and a computer implemented method for performing a transaction by implementing a token provisioning service.

2. Technical Considerations

According to recent changes in the tokenization process, industry stakeholders have to devise alternate mechanisms to handle any transactions, including recurring transactions, e-mandates, Equated Monthly Instalment (EMI) transactions or post-transaction activities. These activities currently involve or require storing of Card-on-File (CoF) data by entities other than card issuers and card networks. The post-transaction activities may include, but are not limited to, chargeback handling, dispute resolution, reward program, loyalty program, etc. According to the revised guidelines for the tokenization process, a token may be created only with an explicit customer consent and if the merchant is enabled on a CoF Tokenization (CoFT) framework.

Presently, guest checkout transactions allow a customer to purchase desired goods and services online without logging into or creating a store account. Further, the guest checkout transaction flows are where cardholders decide to enter card information details manually at the time of undertaking the transaction. As the customer has not created an account, the merchants do not retain any information that customers enter during checkout process and are unable to associate a card with a customer profile. The customers prefer to use the guest checkout transaction method to complete a one-time quick purchase without having to create a user profile with the merchant, as they do not foresee themselves visiting the merchant platform on a regular basis. As a result, whenever the customer returns to make a purchase, the customer has to input 16-digit card number on merchant website.

The scenario described above applies to other use cases as well, including, transactions in which the customer may not provide consent for tokenization or when the customer provides tokenization consent during a transaction, completes a first transaction using Primary Account Number (PAN), followed by provisioning. The repeat transactions will use tokens. However, the first transaction still gets completed using the PAN. In these transactions, the merchant sends an authorization message through its payment aggregator, who in turn, passes on the chain to a Payment Gateway (PG)/Payment Acquirer (PA). Therefore, the 16-digit card number that is captured is only used in transit, and that too for completing the authorization message. As a result, the PG or the PA need to create clearing files using the transaction details, which includes card number to manage transaction lifecycle events such as refunds, pricing/Merchant Discount Rate (MDR) calculation, settlement/reconciliation, etc. Also, these transaction details are retained by the PG or the merchant until the completion of the transaction lifecycle. Other than the PG or the PA, no merchant may be allowed to store the 16-digit card information on their platform for guest checkout transactions. Thus, there is a need to provide a solution for securely carrying out the transaction lifecycle events without customer consent.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Additional features and advantages are realized through the techniques of the present disclosure. Other non-limiting embodiments and aspects of the disclosure are described in detail herein and are considered a part of the claimed disclosure. Provided are improved methods and systems for performing transactions by implementing a tokening provisioning service.

Disclosed herein is a computer-implemented method for performing a transaction. The method may include receiving a card information of a user from an entity for performing the transaction. Further, the method may include identifying whether an alternate identifier is present for the card information in a first server. Thereafter, the method may include transmitting, upon identifying presence of the alternate identifier in the first server, the alternate identifier from the first server and a cryptogram value associated with the alternate identifier to the entity for performing the transaction. The method may include transmitting, upon not identifying the alternate identifier in the first server, the alternate identifier for the card information by obtaining the alternate identifier from a second server and the cryptogram value associated with the alternate identifier to the entity for performing the transaction. The cryptogram value may be fetched in real-time for the transaction based on the alternate identifier from the second server.

In some non-limiting embodiments, the present disclosure may include a system. The system may include a first server and a second server communicatively coupled to the first server. The first server may be configured to receive a card information of a user from an entity for performing the transaction. Further, the first server may be configured to identify whether an alternate identifier is present for the card information. The first server may be configured to transmit the alternate identifier from the first server and a cryptogram value associated with the alternate identifier to the entity for performing the transaction, when the presence of the alternate identifier is identified in the first server. The second server may be configured to transmit the alternate identifier for the card information by obtaining the alternate identifier from the second server and the cryptogram value associated with the alternate identifier to the entity for performing the transaction when the presence of the alternate identifier is not identified in the first server. The cryptogram value may be fetched in real-time for the transaction based on the alternate identifier from the second server.

In some non-limiting embodiments, the present disclosure may include a non-transitory computer readable medium including instructions stored thereon that when processed by at least one processor may cause a system to perform a transaction. The instruction may cause the system to receive a card information of a user from an entity for performing the transaction. Further, the instruction may cause the system to identify whether an alternate identifier is present for the card information in a first server. The instruction may cause the system to transmit, upon identifying presence of the alternate identifier in the first server, the alternate identifier from the first server and a cryptogram value associated with the alternate identifier to the entity for performing the transaction. Further, the instruction may cause the system to transmit, upon not identifying the alternate identifier in the first server, the alternate identifier for the card information by obtaining the alternate identifier from a second server and the cryptogram value associated with the alternate identifier to the entity for performing the transaction. The cryptogram value may be fetched in real-time for the transaction based on the alternate identifier from the second server.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristics of the disclosure are set forth in the appended claims. The disclosure itself, however, as well as a preferred mode of use, further objectives and advantages thereof, may best be understood by reference to the following detailed description of an illustrative and non-limiting embodiment when read in conjunction with the accompanying drawings. The accompanying drawings, which are incorporated in and constitute a part of this disclosure, illustrate exemplary and non-limiting embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
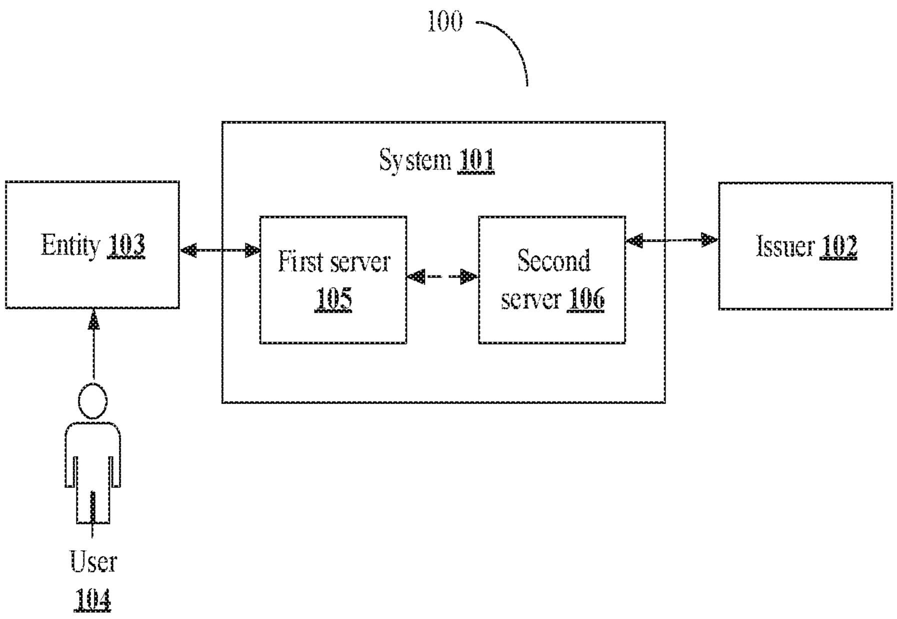
FIG. 1 shows an exemplary environment illustrating a method for performing a transaction, in accordance with non-limiting embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" and/or "non-limiting" is not necessarily to be construed as preferred or advantageous over other embodiments. "Real-time" refers to the capability of a system or process to receive, process, and respond to inputs or events within a timeframe that is imperceptible to the user or in accordance with the constraints of the application domain. For example, a real-time action may be performed with respect to a payment transaction such that the action is performed during a payment transaction and/or before a payment transaction is authorized, completed, and/or the like. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

While the disclosure is susceptible to various modifications and alternative forms, specific embodiments thereof has been shown by way of example in the drawings and may be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises a" or "includes a" does not, without more constraints, preclude the existence of other elements or additional elements in the system or apparatus.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

The present disclosure may relate to a system and a computer-implemented method for performing a transaction. In non-limiting embodiments, the method may comprise receiving card information of a user (also, referred as a customer) from an entity such as merchant or a payment aggregator for performing a transaction. In response to receiving the card information, the method may comprise identifying whether an alternate identifier for the received card information is present in a first server. If the alternate identifier is present in the first server, the method may comprise transmitting the alternate identifier from the first server and a cryptogram value associated with the alternate identifier to the entity for performing the transaction. If the alternate identifier is not present in the first server, the method may comprise transmitting the alternate identifier for the card information by obtaining the alternate identifier from a second server and the cryptogram value associated with the alternate identifier to the entity for performing the transaction. The entity may be a merchant or a payment aggregator. The cryptogram value may be fetched in real-time for the transaction based on the alternate identifier from the second server. In some non-limiting embodiments, the transaction may be a guest checkout transaction, or a payment transaction.

In non-limiting embodiments, the system and the computer-implemented method of the present disclosure provide a convenient way for merchants to perform post-transaction services such as refunds, pricing/MDR calculation, settlement/reconciliation, etc. upon completion of transaction without storing card information of the user. The present disclosure eliminates the need for issuer round-trip for alternate identifier provisioning approval each time, thus, reducing transaction latency and bottlenecks at an issuer end significantly. Further, the present disclosure provisions a cryptogram value for each transaction along with the alternate identifier, thereby making transaction secure.

In the following detailed description of the embodiments of the disclosure, reference is made to the accompanying drawings that form a part hereof, and in which are shown by way of illustration specific embodiments in which the disclosure may be practiced. These non-limiting embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a method for performing a transaction, in accordance with non-limiting embodiments of the present disclosure.

In some implementations, the environment 100 may include an entity 103, a user 104, an issuer 102 and a system 101. The system 101 comprises a first server 105 and a second server 106. In some non-limiting embodiments, the second server 106 may be communicatively coupled with the first server 105. The issuer 102 may be a bank or a payment authorizing authority.

In non-limiting embodiments, the system 101 i.e., the first server 105 and the second server 106 may be a computing system configured to perform a technical process of a transaction. In detail, the first server 105 may be configured to receive a card information of the user 104 from the entity 103. Thereafter, the first server 105 may be configured to identify whether an alternate identifier is present for the card information in the first server 105. The alternate identifier may, also, be referred as a token. Upon identifying presence of the alternate identifier in the first server 105, the first server 105 may be configured to transmit alternate identifier from the first server 105 and a cryptogram value associated with the alternate identifier to the entity 103 for performing transaction. The cryptogram value may, also, be referred as Token Authentication Verification Value (TAVV). Upon not identifying the alternate identifier in the first server 105, the second server 106 may be configured to transmit the alternate identifier for the card information by obtaining the alternate identifier from the second server 106 and the cryptogram value associated with the alternate identifier to the entity 103 for performing the transaction. The system 101 i.e., the first server 105 and the second server 106 may be an issuer entity such as, without limiting to, a payment server, a payment network and the like. The entity 103 may include, but is not limited to, a merchant, a payment aggregator and the like. In some non-limiting embodiments, the user 104 may interact with the entity 103 using a medium such as, for example, a mobile application installed on a computing device of the user 104 and/or a web application. As an example, the computing device may include, without limiting to, a smartphone, a Personal Digital Assistant (PDA), a laptop, or a desktop computer.

Hereinafter, the operation/method for performing a transaction is explained in detail. The first server 105 of the system 101 may receive a card information of the user 104 from the entity 103 for performing the transaction. The card information may include, but not limited to, Primary Account Number (PAN) of the user 104. In some non-limiting embodiments, the transaction may be a guest checkout transaction performed by the user 104. In some non-limiting embodiments, the transaction may be a payment transaction performed by the user 104. Here, the payment transaction may refer to a transaction when user 104 is providing his/her consent to store his/her card details. The first transaction that provisions a token can still use the alternate identifier (mentioned in this present disclosure) for completing the first transaction. This way the merchant/payment aggregator/payment gateway need not store the PAN of the user 104 on a token provisioning transaction. The first server 105 of the system 101 may identify whether an alternate identifier is present for the card information in the first server 105. The first server 105 of the system 101 may transmit the alternate identifier from the first server 105 and a cryptogram value associated with the alternate identifier to the entity 103 for completion of the transaction, when the presence of the alternate identifier is identified in the first server 105. Alternatively, the second server 106 of the system 101 may transmit the alternate identifier for the card information by obtaining the alternate identifier from the second server 106 and the cryptogram value associated with the alternate identifier to the entity 103 for completion of the transaction. The cryptogram value may be fetched in real-time for the transaction based on the alternate identifier from the second server 106. In non-limiting embodiments, prior to transmitting the alternate identifier for the card information by obtaining the alternate identifier from the second server 106, the second server 106 of the system 101 may generate the alternate identifier for the card information. Thereafter, the second server 106 of the system 101 may transmit the alternate identifier from the second server 106 to the issuer 102 for provisioning approval. Further, the second server 106 of the system 101 may transmit the alternate identifier and the cryptogram value associated with the alternate identifier for the card information from the second server 106 to the entity 103 through the first server 105, upon receiving the provisioning approval from the issuer 102. In some non-limiting embodiments, the alternate identifier and the cryptogram value associated with the alternate identifier may be used for validating the transaction of the user 104.

In non-limiting embodiments, upon transmitting the alternate identifier and the cryptogram value associated with the alternate identifier to the entity 103, the second server 106 of the system 101 may validate the transaction of the user 104 based on the alternate identifier and the cryptogram value associated with the alternate identifier. The second server 106 of the system 101 may transmit the alternate identifier and the card information of the user 104 to the issuer 102. Further, the second server 106 of the system 101 may receive a response for the transaction from the issuer 102 based on the alternate identifier and the card information of the user 104. In some non-limiting embodiments, the response may indicate completion or rejection of the transaction. Further, the second server 106 of the system 101 may transmit the response to the entity 103.

Figure 2A:
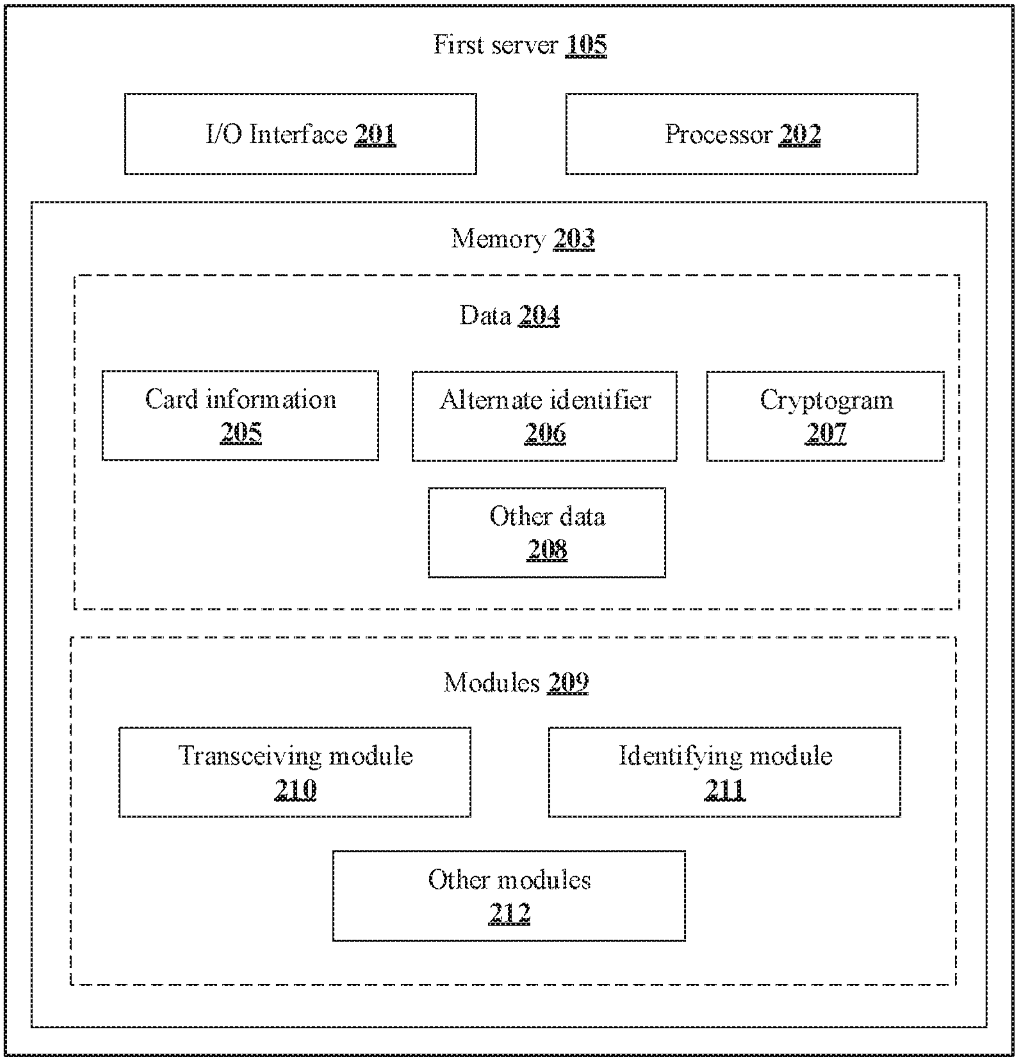
FIGS. 2*a* and 2*b* show a detailed block diagram of a first server and second server, respectively, in accordance with some embodiments of the present disclosure.
Figure 2B:
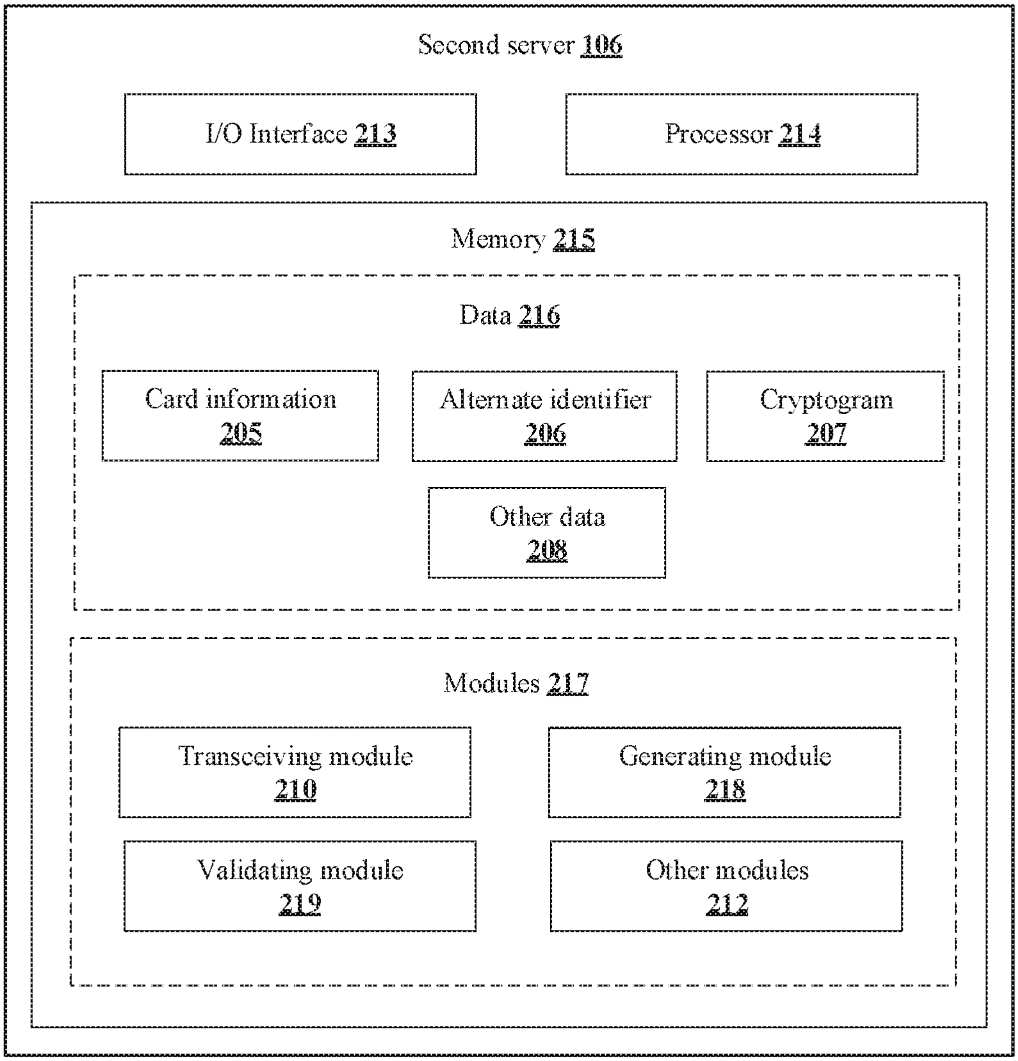

FIGS. 2*a* and 2*b* show detailed block diagrams of a first server and a second server, respectively, in accordance with non-limiting embodiments of the present disclosure.

In some implementations, the first server 105 of the system 101 may include a processor 202, a I/O interface 201 and a memory 203. The processor 202 may be used to perform various functions of the first server 105 using the data and the modules 209 stored in the memory 203. The I/O interface 201 may be used for interfacing the first server 105 with one or more external computing devices, for example, a mobile/web application of the entity 103 utilized by the user 104 for performing transaction. In non-limiting embodiments, the data 204 may be stored in a memory 203 of the first server 105 as shown in the FIG. 2*a*. As an example, the data 204 may include card information 205, an alternate identifier 206, a cryptogram value 207, and other data 208. In some other implementations, the second server 106 of the system 101 may include a processor 214, a I/O interface 213 and a memory 215. The processor 214 may be used to perform various functions of the second server 106 using the data and the modules 217 stored in the memory 215. The I/O interface 213 may be used for interfacing the second server 106 with one or more external computing devices, for example, a mobile/web application of the entity 103 utilized by the user 104 for performing transaction. In non-limiting embodiments, the data 216 may be stored in a memory 215 of the second server 106 as shown in the FIG. 2*b*. As an example, the data 216 may include the card information 205, the alternate identifier 206, the cryptogram value 207, and the other data 208.

In non-limiting embodiments, the data 204 may be stored in the memory 203 in form of various data structures. Additionally, the data 204 can be organized using data models, such as relational or hierarchical data models. The other data 208 of the first server 105 may store data, including temporary data and temporary files, generated by the modules 209 for performing the various functions of the first server 105. In some other embodiments, the data 216 may be stored in the memory 215 in form of various data structures. Additionally, the data 216 can be organized using data models, such as relational or hierarchical data models. The other data 208 of the second server 106 may store data, including temporary data and temporary files, generated by the modules 217 for performing the various functions of the second server 106.

In non-limiting embodiments, the card information 205 of the first server 105 and the of the second server 106 may store card details of the user 104 utilized for performing transactions. In non-limiting embodiments, the card information 205 of the first server 105 and the of the second server 106 may include the PAN number of the user 104 for performing guest checkout transactions, or payment transactions.

In non-limiting embodiments, the alternate identifier 206 of the first server 105 and of the second server 106 may store a value utilized in place of the PAN. In non-limiting embodiments, the alternate identifier may be generated by card issuing network i.e., the second server 106 for performing guest checkout transactions, and payment transactions.

In non-limiting embodiments, the cryptogram value 207 of the first server 105 and of the second server 106 may store a unique value associated with the alternate identifier for authorizing the transaction. In non-limiting embodiments, the cryptogram value 207 may be fetched in real-time for the transaction from the second server 106. The cryptogram value may be provided to the entity 103 in response to legitimate transaction routed through the first server. The first server 105 may, also, be referred as Alt ID i.e., Alternate Identifier service.

In non-limiting embodiments, each of the data 204 stored in the memory 203 may be processed by the modules 209 of the first server 105. The modules 209 may be stored within the memory 203. In an example, the modules 209 may be communicatively coupled to the processor 202 configured in the first server 105. Alternatively, the modules 209 may also be present outside the memory 203 (not shown in FIG. 2*a*) and implemented as individual hardware components. As used herein, the term modules 209 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality. In some other embodiments, each of the data 216 stored in the memory 215 may be processed by the modules 217 of the second server 106. The modules 217 may be stored within the memory. In some non-limiting embodiments, modules and/or processors may be implemented in hardware, firmware, or a combination of hardware and software. 215. In an example, the modules 217 may be communicatively coupled to the processor 214 configured in the second server 106. Alternatively, the modules 217 may also be present outside the memory 215 (not shown in FIG. 2*b*) and implemented as individual hardware components. As used herein, the term modules 217 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In non-limiting embodiments, the modules 209 of the first server 105 may include, for example, a transceiving module 210, an identifying module 211, and other modules 212. The other modules 212 of the first server 105 may be used to perform various miscellaneous functionalities of the first server 105. It will be appreciated that such aforementioned modules 209 may be represented as a single module or a combination of different modules. In some other embodiments, the modules 217 of the second server 106 may include, for example, the transceiving module 210, a generating module 218, a validating module 219, and other modules 212. The other modules 212 of the second server 106 may be used to perform various miscellaneous functionalities of the second server 106. It will be appreciated that such aforementioned modules 217 may be represented as a single module or a combination of different modules.

In non-limiting embodiments, the transceiving module 210 of the first server 105 may be configured to receive the card information of the user 104 from the entity 103 for performing a transaction. The transceiving module 210 of the first server 105 may receive the PAN of the user 104 to complete the transaction. The transaction may be a guest checkout transaction, or a payment transaction. In non-limiting embodiments, the identifying module 211 of the first server 105 may be configured to identify whether the alternate identifier is present for that card information in the first server 105. In some non-limiting embodiments, the identifying module 211 of the first server 105 may check if there is a presence of the alternate identifier in a database associated with the first server 105.

In non-limiting embodiments, the transceiving module 210 of the first server 105 may be configured to transmit the alternate identifier from the first server 105 along with the cryptogram value associated with the alternate identifier to the entity 103 for completion of the transaction. In non-limiting embodiments, the transceiving module 210 of the first server 105 may transmit the alternate identifier and the cryptogram value associated with the alternate identifier to the entity 103 for completion of the transaction upon identifying the presence of the alternate identifier in the first server 105.

In non-limiting embodiments, the transceiving module 210 of the second server 106 may be configured to transmit the alternate identifier for the card information by obtaining the alternate identifier from the second server 106 along with the cryptogram value associated with the alternate identifier to the entity 103 for completion of the transaction. The transaction may be a guest checkout transaction, or a payment transaction. In non-limiting embodiments, the transceiving module 210 of the second server 106 may transmit the alternate identifier from the second server 106 and the cryptogram value associated with the alternate identifier to the entity 103 for completion of the transaction upon not identifying the presence of the alternate identifier in the first server 105. In non-limiting embodiments, when the alternate identifier is not present for the card information, the generating module 218 of the second server 106 may generate the alternate identifier for the card information. Thereafter, the transceiving module 210 of the second server 106 may transmit the generated alternate identifier from the second server 106 to the issuer 102 for obtaining a provisioning approval. In non-limiting embodiments, the transceiving module 210 of the second server 106 may be configured to transmit the alternate identifier along with the cryptogram value associated with the alternate identifier for the card information from the second server 106 to the entity 103 via the first server 105, when the issuer 102 provides the provisioning approval.

In some non-limiting embodiments, the validating module 219 of the second server 106 may be configured to validate the transaction of the user 104 based on the alternate identifier and the cryptogram value associated with the alternate identifier. In some non-limiting embodiments, the transceiving module 210 of the second server 106 may transmit the alternate identifier and the card information of the user 104 to the issuer 102 for validating the transaction. In some non-limiting embodiments, the transceiving module 210 of the second server 106 may be configured to receive a response for the transaction from the issuer 102 based on the alternate identifier and the card information of the user 104. In non-limiting embodiments, the response may indicate either the completion or the rejection of the transaction. The transaction may be a guest checkout transaction, or a payment transaction. Further, the transceiving module 210 of the second server 106 may transmit the response to the entity 103.

FIGS. 3*a*, 3*b*, 3*c* and 3*d* show exemplary scenarios illustrating for performing a transaction, in accordance with non-limiting embodiments of the present disclosure.

Figure 3A:
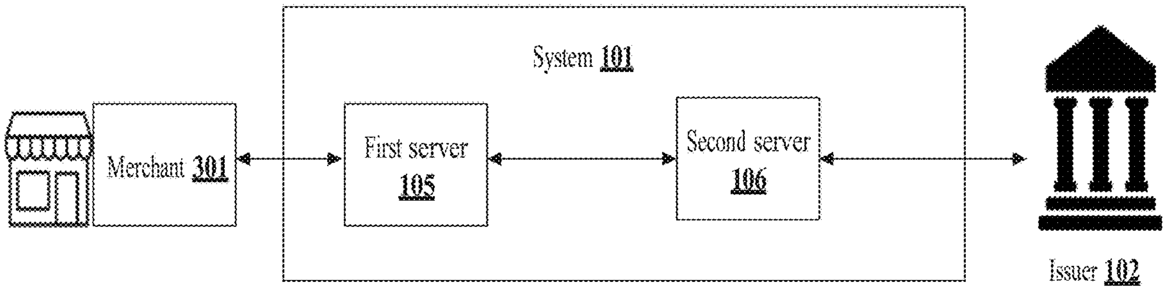
FIGS. 3*a*, 3*b*, 3*c* and 3*d* show exemplary scenarios illustrating for performing a transaction in accordance with non-limiting embodiments of the present disclosure.
Figure 3B:
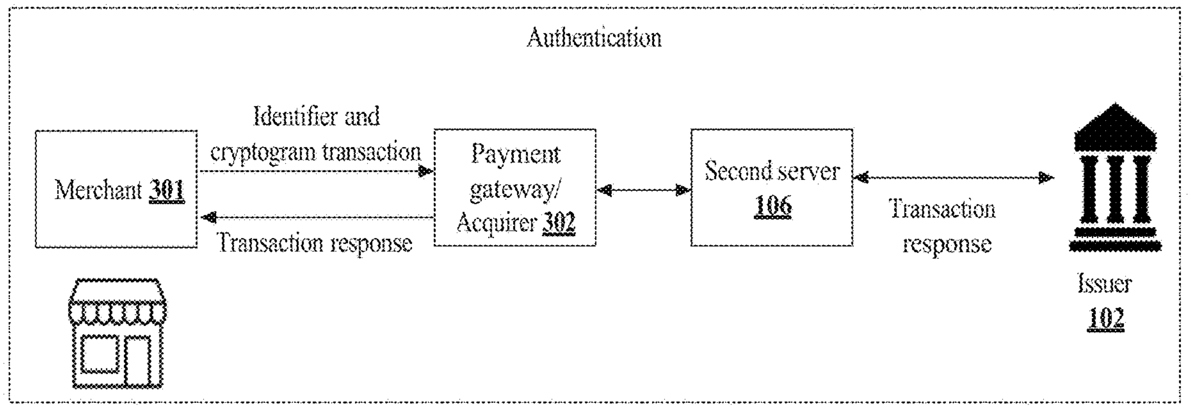

In non-limiting embodiments, FIGS. 3*a* and 3*b* show transaction flow when an alternate identifier is not present in the first server 105 for a customer (also, be referred as a user) i.e., a transaction is carried out with a newly provisioned alternate identifier. In non-limiting embodiments, FIGS. 3*a* and 3*b* show a merchant 301 (also, be referred as the entity

103), a first server 105, a second server 106, an issuer 102, and a Payment Gateway (PG)/an acquirer 302. In non-limiting embodiments, the merchant 301, the first server 105, the second server 106, the issuer 102, the PG/acquirer 302 may interact with each other to perform a transaction. The transaction may be a guest checkout transaction, or a payment transaction. In some non-limiting embodiments, FIGS. 3*a* and 3*b* shows a flow diagram illustrating processing of transactions with the first server 105 and the second server 106 with respect to a first/new transaction on a card of the user 104 (not shown in FIGS. 3*a* and 3*b*). For example, consider a user 104 initiates a guest checkout transaction with the merchant 301 for purchasing a product. For example, the merchant 301 may a cloth merchant or a retail merchant. In such a scenario, after purchasing the product, the user 104 may initiate card transaction process with the merchant 301. In non-limiting embodiments, the merchant 301 may send the card information of the user 104 to a payment aggregator. Further, the merchant 301 or the payment aggregator may send/transmit the card information related to the user 104 for receiving the alternate identifier and the cryptogram value. In some non-limiting embodiments, the alternate identifier may also be referred as a token. In non-limiting embodiments, the cryptogram value may also be referred as a Token Authentication Verification Value (TAVV). Subsequently, the first server 105 may look-up through a database (also, referred as a tokenization database) associated with the first server 105 to find if the alternate identifier already exists for the card information of the user 104 in the database. In some non-limiting embodiments, the first server 105 may not have the alternate identifier for the card if the user 104 is using the card for the first time.

In some non-limiting embodiments, when the alternate identifier is not stored in the first server 105, the first server 105 may transmit request to the second server 106 to provide a new alternate identifier. The second server 106 may generate the alternate identifier for the card information. Thereafter, the second server 106 may transmit the alternate identifier to the issuer 102 for provisioning approval. Upon receiving the provisioning approval from the issuer 102, the second server 106 may transmit the alternate identifier to the first server 105. The first server 105 may save the alternate identifier for future use (i.e., for repeated transactions). In some non-limiting embodiments, the first server 105 may also request the second server 106 for the cryptogram value associated with the alternate identifier for the card information, which is linked directly to the transaction as an authentication code. The first server 105 may fetch the cryptogram value associated with the alternate identifier for the card information from the second server subsequently, the first server 105 may transmit the alternate identifier and the cryptogram value to the merchant 301 or the payment aggregator. Thereafter, the merchant 301 or the payment aggregator may send the alternate identifier for issuer authentication as shown in FIG. 3*b*. The merchant 301 may send the alternate identifier and the cryptogram value associated with the alternate identifier to the PG/acquirer 302 for authorization. Further, the PG/acquirer 302 may send the alternate identifier and the cryptogram value associated with the alternate identifier to the second server 106 for authorization. The second server 106 may validate the transaction of the user based on the alternate identifier and the cryptogram value associated with the alternate identifier and transmit the alternate identifier and the card information of the user to the issuer 102. In the present case, the card information of the user 104 may be the PAN. Based on the alternate identifier and the card information of the user 104, the second server 106 may receive a response for the transaction from the issuer 102. The response may indicate completion or rejection of the transaction. The second server 106 may send the transaction response to the PG/acquirer 302. Thereafter, the PG/acquirer 302 may send the transaction response to the merchant 301 for completion of the transaction. In some non-limiting embodiments, the alternate identifier may be utilised for performing actions such as clearing, settlement, or post transaction activities by the merchant 301 or the payment aggregator.

Figure 3C:
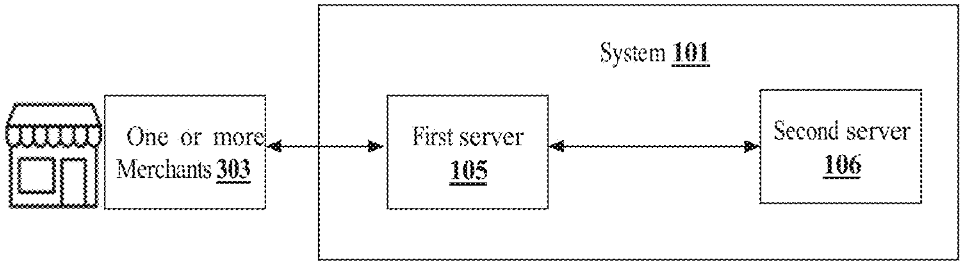
Figure 3D:
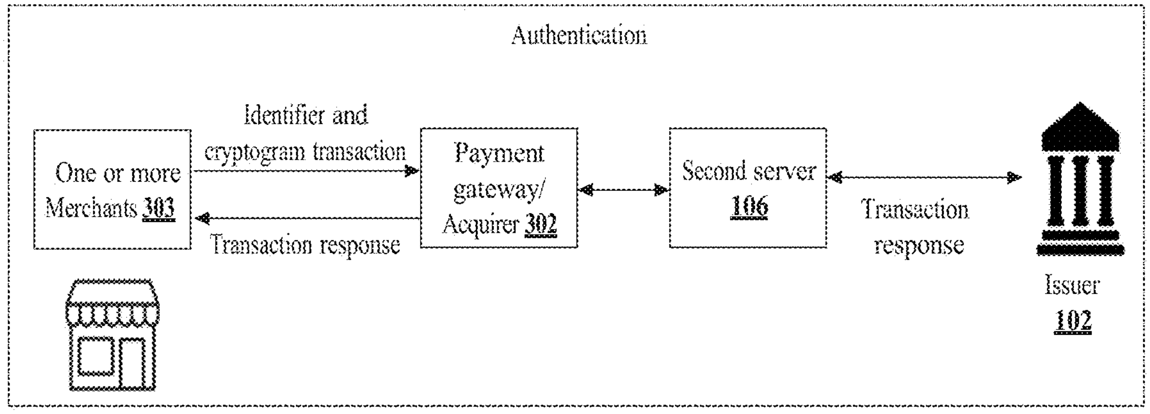

In non-limiting embodiments, FIGS. 3*c* and 3*d* show transaction flow when an alternate identifier is present in the first server 105 for a customer (also, be referred as a user) i.e., a transaction is carried out using a previously generated alternate identifier. In non-limiting embodiments, FIGS. 3*c* and 3*d* show one or more merchants 303 (also, be referred as the entity 103), the first server 105, the second server 106, the issuer 102, and the PG/acquirer 302. In non-limiting embodiments, the one or more merchants 303, the first server 105, the second server 106, the issuer 102, the PG/acquirer 302 may interact with each other to perform a transaction. The transaction may be a guest checkout transaction, or a payment transaction. For example, in case of a repeated transaction and/or when the card is already tokenized by merchant 301 (process as explained above with respect to FIGS. 3*a* and 3*b*) and/or payment aggregator, the same token/alternate identifier may be used for any subsequent transactions by the one or more merchants 303 and/or payment aggregator, as illustrated in FIGS. 3*c* and 3*d*. That is, the one or more merchants 303 may send the card information of the user 104 (not shown in FIGS. 3*c* and 3*d*) to their respective payment aggregator. Further, the one or more merchants 303 or the payment aggregator may send/transmit the card information related to the user 104 to the first server 105 for receiving the alternate identifier and the cryptogram value corresponding to the card information. Thereafter, the first server 105 may look-up through the database (also, referred as the tokenization database) associated with the first server 105 to find if the alternate identifier already exists for the card information of the user 104 in the database. Since a transaction was carried out using the same card previously, the database may indicate that the alternate identifier is available for the card information. Accordingly, the first server 105 may transmit/send a request to the second server 106 for a cryptogram value corresponding to the alternate identifier for the card information. The first server 105 may fetch the cryptogram value associated with the alternate identifier for the card information from the second server 106. The first server 105 may transmit the alternate identifier and the cryptogram value associated with the alternate identifier to the one or more merchants 303 and/or their respective payment aggregator for further processing. The one or more merchants 303 or the payment aggregator may send the alternate identifier and the cryptogram value associated with the alternate identifier for issuer authentication. The one or more merchants 303 may send the alternate identifier and the cryptogram value associated with the alternate identifier to the PG/acquirer 302 for authorization as shown in FIG. 3*d*. Further, the PG/acquirer 302 may send the alternate identifier and the cryptogram value to the second server 106 for authorization. The second server 106 may validate the transaction of the user based on the alternate identifier and the cryptogram value associated with the alternate identifier and transmit the alternate identifier and the card information of the user 104 to the issuer 102. In the present case, the card information of the user 104 may be the PAN. Based on the alternate identifier and the card information of the user 104, the second server 106 may receive a response for the transaction from the issuer 102. The response may indicate completion or rejection of the transaction. The second server 106 may send the transaction response to the PG/acquirer 302. Thereafter, the PG/acquirer 302 may send the transaction response to the one or more merchants 303 for completion of the transaction. In some non-limiting embodiments, the alternate identifier may be utilised for performing actions such as clearing, settlement, or post transaction activities by the one or more merchants 303 or the payment aggregator. In some non-limiting embodiments, the alternate identifier may be utilised for performing actions such as clearing, settlement, or post transaction activities by the one or more merchants 303 and/or the payment aggregator.

The use case for first transaction that provisions a token and still uses the alternate identifier (mentioned in this present disclosure) is presented below:

In some non-limiting embodiments, consider that the user 104 initiates a payment transaction with the entity 103 for first time and provides a consent to create a token for his/her card information. In this scenario, consider the card information of the user 104 comprises the alternate identifier in the first server 105. The entity 103 may be cloth merchant, grocery merchant, jewelry merchant and the like. A person skilled in the art may appreciate that the entity 103 may be any merchant and is not limited to the above-mentioned examples. When the user 104 initiates the first sale transaction with the entity 103 and provides consent for tokenization, the entity 103 may send the card information of the user 104 to a payment aggregator. Further, the entity 103 or the payment aggregator may send/transmit the card information related to the user 104 for receiving the alternate identifier and the cryptogram value. Upon receiving, the alternate identifier and the cryptogram value, the second server 106 may utilise the alternate identifier for authenticating the transaction. Subsequently, the second server 106 may provision a token for the card information of the user 104. Further, the second server 106 may utilise the alternate identifier for performing authorization process and complete the first transaction. In some non-limiting embodiments, for subsequent transactions, the second server 106 may utilise the provisioned token for completion of the subsequent transactions. In some non-limiting embodiments, the entity 103 may store the card information of the user 104 for a predefined time period (i.e., T+1 days) to complete necessary steps while creating the token. The predefined time period may be in days, weeks and the like.

Figure 4:
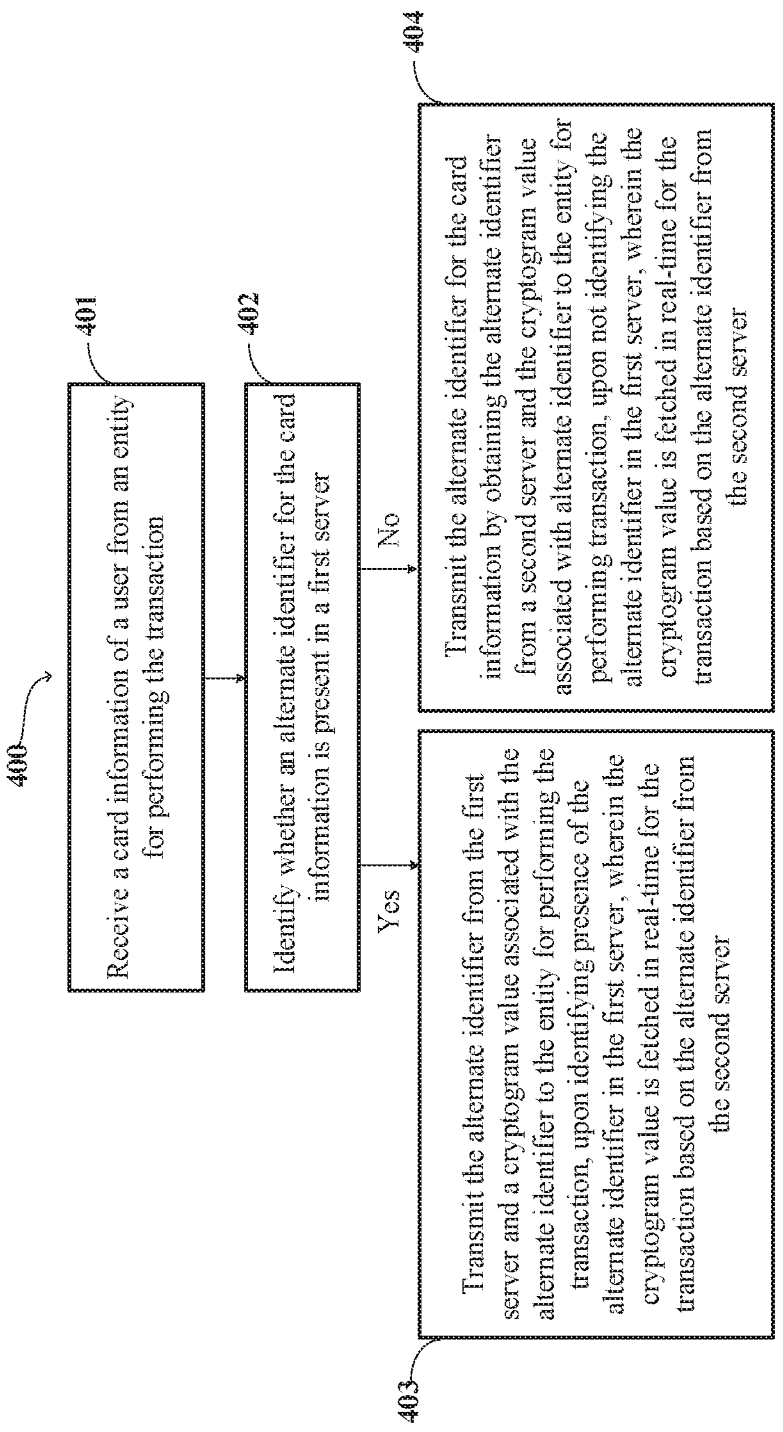
FIG. 4 shows a flowchart illustrating a method for performing a transaction in accordance with non-limiting embodiments of the present disclosure.

FIG. 4 shows a flowchart illustrating a method for performing a transaction, in accordance with non-limiting embodiments of the present disclosure.

The order in which the method 400 is described is not intended to be construed as a limitation, and any number of the described method blocks can be combined in any order to implement the method 400. Additionally, individual blocks may be deleted from the methods without departing from the scope of the subject matter described herein. Furthermore, the method 400 can be implemented in any suitable hardware, software, firmware, or combination thereof.

At block 401, the method 400 may include receiving, by a first server 105 of a system 101, a card information of a user from an entity 103 for performing the transaction. The card information may comprise Primary Account Number (PAN) of the user 104. The transaction may be a guest checkout transaction, or a payment transaction. The entity 103 may be a merchant or a payment aggregator.

At block 402, the method 400 may include identifying, by the first server 105, whether an alternate identifier is present for the card information in the first server 105.

At block 403, the method 400 may include transmitting, by the first server 105, the alternate identifier from the first server 105 and a cryptogram value associated with the alternate identifier to the entity 103 for performing the transaction, when the alternate identifier is present in the first server 105.

At block 404, the method 400 may include transmitting, by the first server 105, the alternate identifier for the card information by obtaining the alternate identifier from the second server 106 and the cryptogram value associated with the alternate identifier to the entity 103 for performing the transaction, when the alternate identifier is not present in the first server 105. Further, the cryptogram value is fetched in real-time for the transaction based on the alternate identifier from the second server 106.

Some of the advantages of the present disclosure are listed below.

The system and the computer-implemented method of the present disclosure provide a convenient way for merchants to perform post-transaction services such as refunds, pricing/MDR calculation, settlement/reconciliation, etc. upon completion of transaction without storing card information of the user.

The present disclosure eliminates the need for issuer round-trip for alternate identifier provisioning approval each time, thus, reducing transaction latency and bottlenecks at an issuer end significantly.

The present disclosure provisions a cryptogram value for each transaction along with the alternate identifier, thereby making the transaction secure. For instance, every successful transaction requires a dynamically generated cryptogram value, along with an alternate identifier. This cryptogram value will be made available to a merchant/entity only in response to legitimate transaction routed through alternate identifier service (or through the first server). Even if an alternate identifier is leaked and presented for any illegitimate transaction, it cannot be used to carry out a payment transaction as the alternate identifier without cryptogram cannot be used to complete successful transaction.

The alternate identifier generated by the system of the present disclosure cannot be used by any other requestor/network service, thereby further adding to the transaction security.

With implementation of the system and the computer-implemented method of the present disclosure, alternate identifier generation does not require customer/user's consent as the customer/user has to enter only the card information comprising Primary Account Number (PAN).

Figure 5:
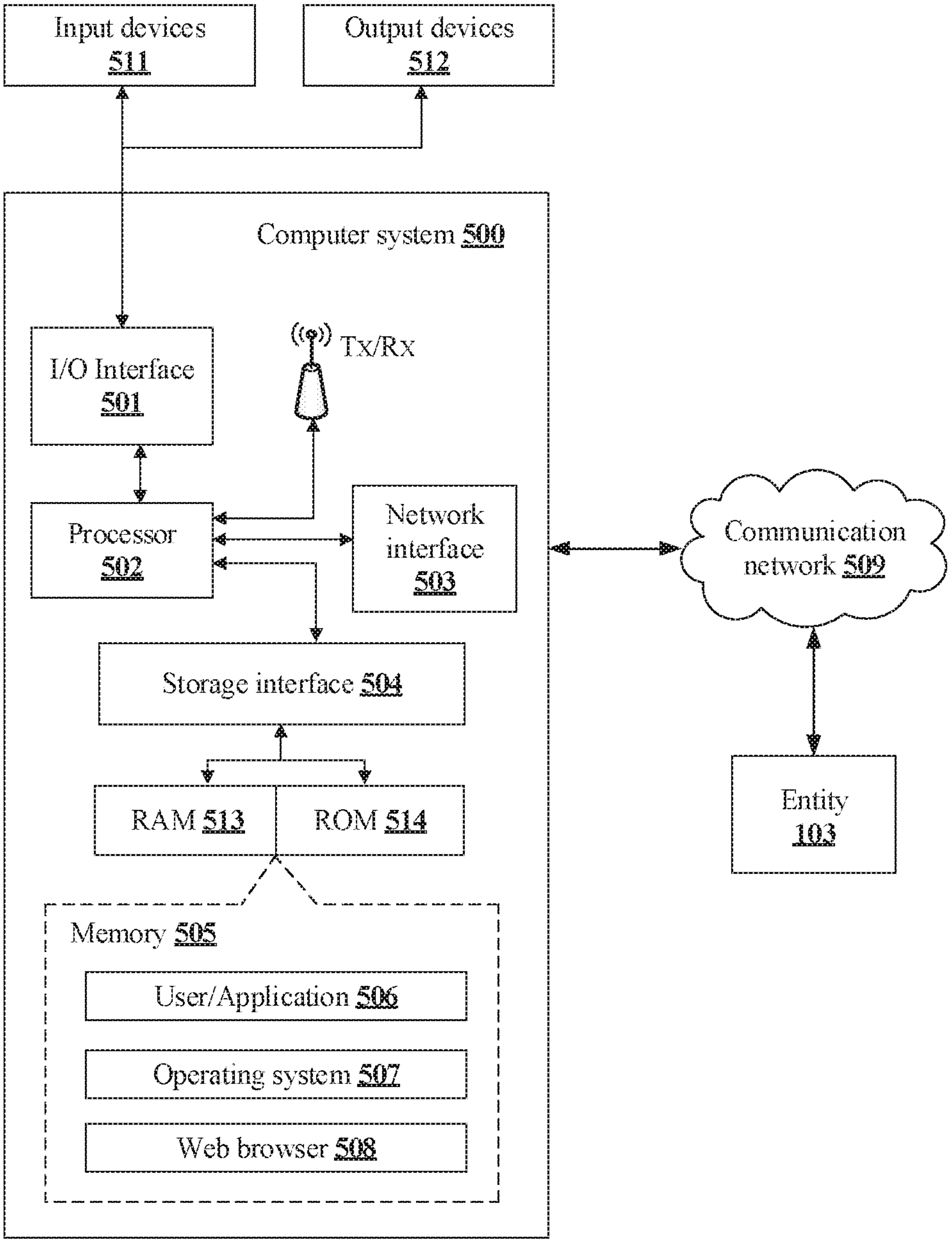
FIG. 5 is a block diagram of an exemplary computer system for implementing embodiments consistent with the present disclosure.

FIG. 5 is a block diagram of an exemplary computer system for implementing embodiments consistent with the present disclosure.

In non-limiting embodiments, the computer system 500 may be the first server 105 of the system 101 that is used for performing a transaction. Analogously, another computer system 500 may be the second server 106 of the system 101 that is used for performing the transaction. The computer system 500 may include a central processing unit ("CPU" or "processor") 502. The processor 502 may include at least one data processor for executing program components for performing the transaction. The processor 502 may include specialized processing units such as integrated system (bus)

controllers, memory management control units, floating point units, graphics processing units, digital signal processing units, etc.

The processor 502 may be disposed in communication with input devices 511 and output devices 512 via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 501, the computer system 500 may communicate with the input devices 511 and the output devices 512.

In non-limiting embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may interface/communicate with a device associated with an entity 103 for performing the transaction.

In non-limiting embodiments, the communication network 509 can be implemented as one of the different types of networks, such as intranet or Local Area Network (LAN), Closed Area Network (CAN), etc. The communication network 509 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc. In non-limiting embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, a user interface/application 506, an operating system 507, a web browser 508, etc. In non-limiting embodiments, the computer system 500 may store user/application data, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX DISTRIBUTIONS (E.G., RED HAT®, UBUNTU®, KUBUNTU®, etc.), IBM® OS/20, MICROSOFT® WINDOWS® (XP®, VISTA®/7/8, 10 etc.), APPLE IOS®, GOOGLE™ ANDROID™, BLACKBERRY® OS, or the like. The user interface 506 may facilitate display, execution, interaction, manipulation, or operation of program components through textual or graphical facilities. For example, user interfaces may provide computer interaction interface elements on a display system operatively connected to the computer system 500, such as cursors, icons, checkboxes, menus, scrollers, windows, widgets, etc. Graphical User Interfaces (GUIs) may be employed, including, without limitation, Apple Macintosh® operating systems' Aqua®, IBM® OS/2", Microsoft® Windows® (e.g., Aero, Metro, etc.), web interface libraries (e.g., ActiveX®, Java®, Javascript®, AJAX, HTML, Adobe® Flash®, etc.), or the like.

In non-limiting embodiments, the computer system 500 may implement the web browser 508 stored program components. The web browser 508 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. The web browser 508 may utilize facilities such as AJAX, DHTML, ADOBE® FLASH®, JAVASCRIPT®, JAVA®, Application Programming Interfaces (APIs), etc. In non-limiting embodiments, the computer system 500 may implement a mail server (not shown in FIG. 5) stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In non-limiting embodiments, the computer system 500 may implement a mail client (not shown in FIG. 5) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIG. 4 show certain events occurring in a certain order. In alternative embodiments, certain operations may be performed in a different order, modified or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

What is claimed is:

1. A computer-implemented method for performing a transaction with a merchant, the method comprising:

receiving, by a first server, card information associated with a payment card of a user from the merchant for performing the transaction based on the merchant receiving an indication that the user does not consent to the merchant storing the card information associated with the payment card of the user upon initiation of the transaction, wherein the first server is associated with an alternate identifier service, and wherein the first server comprises a database storing a plurality of alternative identifiers corresponding to a plurality of payment cards;

determining, by the first server, whether an alternate identifier for the card information is stored in the database;

in response to determining that the alternate identifier is not stored in the database, transmitting, by the first server, a request message to a second server, the request message comprising a request to provide a new alternate identifier, wherein the second server is associated with a card issuing network associated with the payment card;

generating, by the second server, the new alternate identifier for the payment card based on the card information;

transmitting, by the second server, a provisioning request message comprising the new alternate identifier to an issuer system;

upon receiving a provisioning approval from the issuer system, transmitting, by the second server, the new alternate identifier to the first server;

upon receiving a second request message from the first server, transmitting, by the second server, a cryptogram value associated with the new alternate identifier to the first server, wherein the cryptogram value is fetched, in real-time, based on receiving the new alternate identifier, and wherein the cryptogram is linked directly to the transaction as an authentication code;

transmitting, by the first server, the new alternate identifier and the cryptogram to the merchant, wherein the cryptogram is provided to the merchant in response to the transaction being routed through the first server, and wherein the merchant transmits the new alternate identifier and the cryptogram to at least one of a payment gateway or an acquirer for authentication;

receiving, by the second server, the new alternate identifier and the cryptogram from the at least one of the payment gateway or the acquirer;

validating, by the second server, the transaction based on the new alternate identifier and the cryptogram value;

transmitting, by the second server, a transaction message including the new alternate identifier and the card information associated with the payment card to the issuer system;

receiving, by the second server, a transaction response from the issuer system, the transaction response indicating completion or rejection of the transaction; and transmitting, by the second server, the new alternate identifier and the transaction response to the at least one of the payment gateway or the acquirer, wherein the at least one of the payment gateway or the acquirer transmits the new alternate identifier and the transaction response to the merchant, and wherein the merchant uses the new alternate identifier for at least one post-transaction activity associated with the transaction.

2. The computer-implemented method of claim 1, wherein the card information comprises a Primary Account Number (PAN) of the user.

3. The computer-implemented method of claim 1, wherein the transaction is at least one of the following: a guest checkout transaction, a payment transaction, or any combination thereof.

4. The computer-implemented method of claim 1, further comprising:

storing, by the first server, the new alternate identifier for the card information in the memory of the first server upon receiving the new alternate identifier from the second server.

5. The computer-implemented method of claim 1, wherein the at least one post-transaction activity comprises at least one of clearing, settlement, reconciliation, refunding, price calculation, discount calculation, or any combination thereof.

6. A system for performing a transaction with a merchant, the system comprising:

a first server configured to:

receive card information associated with a payment card of a user from the merchant for performing the transaction based on the merchant receiving an indication that the user does not consent to the merchant storing the card information associated with the payment card of the user upon initiation of the transaction, wherein the first server is associated with an alternate identifier service, and wherein the first server comprises a database storing a plurality of alternative identifiers corresponding to a plurality of payment cards;

determine whether an alternate identifier for the card information is stored in the database; and in response to determining that the alternate identifier is not stored in the database, transmit a request message to a second server, the request message comprising a request to provide a new alternate identifier, wherein the second server is associated with a card issuing network associated with the payment card, wherein the second server is communicatively coupled to the first server, and wherein the second server is configured to:

generate the new alternate identifier for the payment card based on the card information;

transmit a provisioning request message comprising the new alternate identifier to an issuer system;

upon receiving a provisioning approval from the issuer system, transmit the new alternate identifier to the first server; and upon receiving a second request message from the first server, transmit a cryptogram value associated with the new alternate identifier to the first server, wherein the cryptogram value is fetched, in real-time, based on receiving the new alternate identifier, and wherein the cryptogram is linked directly to the transaction as an authentication code;

wherein the first server is further configured to:

transmit the new alternate identifier and the cryptogram to the merchant, wherein the cryptogram is provided to the merchant in response to the transaction routed through the first server, and wherein the merchant transmits the new alternate identifier and the cryptogram to at least one of a payment gateway or an acquirer for authentication;

wherein the second server is further configured to:

receive the new alternate identifier and the cryptogram from the at least one of the payment gateway or the acquirer;

validate the transaction based on the new alternate identifier and the cryptogram value;

transmit a transaction message including the new alternate identifier and the card information associated with the payment card to the issuer system;

receive a transaction response from the issuer system, the transaction response indicating completion or rejection of the transaction; and transmit the new alternate identifier and the transaction response to the at least one of the payment gateway or the acquirer, wherein the at least one of the payment gateway or the acquirer transmits the new alternate identifier and the transaction response to the merchant, and wherein the merchant uses the new alternate identifier for at least one post-transaction activity associated with the transaction.

7. The system of claim 6, wherein the card information comprises a Primary Account Number (PAN) of the user.

8. The system of claim 6, wherein the transaction is one of a guest checkout transaction and a payment transaction.

9. The system of claim 6, wherein the first server is further configured to:

store the new alternate identifier for the card information in the memory of the first server upon receiving the new alternate identifier from the second server.

10. The system of claim 6, wherein the at least one post-transaction activity comprises at least one of clearing, settlement, reconciliation, refunding, price calculation, discount calculation, or any combination thereof.

11. A non-transitory computer readable medium including instructions stored thereon that, when processed by at least one processor, cause a system to perform operations comprising:

receiving, by a first server, card information associated with a payment card of a user from a merchant for performing a transaction based on the merchant receiving an indication that the user does not consent to the merchant storing the card information associated with the payment card of the user upon initiation of the transaction, wherein the first server is associated with an alternate identifier service, and wherein the first server comprises a database storing a plurality of alternative identifiers corresponding to a plurality of payment cards;

determining, by the first server, whether an alternate identifier for the card information is stored in the database;

in response to determining that the alternate identifier is not stored in the database, transmitting, by the first server, a request message to a second server, the request message comprising a request to provide a new alternate identifier, wherein the second server is associated with a card issuing network associated with the payment card;

generating, by the second server, the new alternate identifier for the payment card based on the card information;

transmitting, by the second server, a provisioning request message comprising the new alternate identifier to an issuer system;

upon receiving a provisioning approval from the issuer system, transmitting, by the second server, the new alternate identifier to the first server;

upon receiving a second request message from the first server, transmitting, by the second server, a cryptogram value associated with the new alternate identifier to the first server, wherein the cryptogram value is fetched, in real-time, based on receiving the new alternate identifier, and wherein the cryptogram is linked directly to the transaction as an authentication code;

transmitting, by the first server, the new alternate identifier and the cryptogram to the merchant, wherein the cryptogram is provided to the merchant in response to the transaction being routed through the first server, and wherein the merchant transmits the new alternate identifier and the cryptogram to at least one of a payment gateway or an acquirer for authentication;

receiving, by the second server, the new alternate identifier and the cryptogram from the at least one of the payment gateway or the acquirer:

validating, by the second server, the transaction based on the new alternate identifier and the cryptogram value;

transmitting, by the second server, a transaction message including the new alternate identifier and the card information associated with the payment card to the issuer system;

receive, by the second server, a transaction response from the issuer system, the transaction response indicating completion or rejection of the transaction; and transmitting, by the second server, the new alternate identifier and the transaction response to the at least one of the payment gateway or the acquirer, wherein the at least one of the payment gateway or the acquirer transmits the new alternate identifier and the transaction response to the merchant, and wherein the merchant uses the new alternate identifier for at least one post-transaction activity associated with the transaction.

12. The non-transitory computer readable medium of claim 11, wherein the at least one post-transaction activity comprises at least one of clearing, settlement, reconciliation, refunding, price calculation, discount calculation, or any combination thereof.

* * * * *